(12) United States Patent
Eberhardt

(10) Patent No.: US 8,273,440 B2
(45) Date of Patent: Sep. 25, 2012

(54) ARTIFICIAL PATCH OF SNOW

(76) Inventor: Steven C. Eberhardt, Lakewood, CA (US)

( * ) Notice: Subject to any disclaimer, the term of this patent is extended or adjusted under 35 U.S.C. 154(b) by 318 days.

(21) Appl. No.: 12/778,895

(22) Filed: May 12, 2010

(65) Prior Publication Data
US 2011/0277907 A1 Nov. 17, 2011

(51) Int. Cl.
B32B 3/02 (2006.01)
B32B 3/00 (2006.01)
(52) U.S. Cl. .............. 428/80; 428/82; 428/99
(58) Field of Classification Search ........... 428/80, 428/82, 85, 99
See application file for complete search history.

(56) References Cited

U.S. PATENT DOCUMENTS
3,020,811 A 2/1962 Lincoln
6,753,049 B2 6/2004 DeVries

Primary Examiner — Alexander Thomas
(74) Attorney, Agent, or Firm — Scott R. Hansen; Fulwider Patton LLP

(57) ABSTRACT

An artificial patch of snow has a curved outer perimeter. A white hydrophobic pile is affixed to the base layer to form a white turf surface with structures projecting from a plane of the back side of the base layer. The white turf, from a distance, gives the appearance of snow. To secure the pad to a roof, the base layer has areas that are free of pile about the perimeter of the base layer. The pad may include lights, a microcontroller, a music generator, a music jack, and an electrical port. A method for simulating patches of snow on a sloped roof includes placing a first pad on a sloped portion of a roof, such that the white turf surface of the first pad is visible from ground level. The pad is secured to the roof. Other pads may also be placed and secured on the roof at a spaced distance from the first pad, such that the white turf surface of the other pads is visible from ground level.

21 Claims, 3 Drawing Sheets

ARTIFICIAL PATCH OF SNOW

BACKGROUND

It is common to decorate yards and roves for the holiday season. Light displays, cut-outs of animals such as reindeer, and even sound can be incorporated into such displays. In areas where there is natural snow, a good snowfall can turn the display into a Winter wonderland. But in areas where there is no snow, efforts have been made to include artificial snow in holiday displays. This artificial snow may range from styrofoam or plastic blocks, to white spray paint, to a white stringy webbing, to white paper snowmen.

In nature, though, there is rarely an even coating of snow. After a snowfall, snow melts into patches, oftentimes on the pitched roofs of houses. Styrofoam or plastic blocks, spray paint, stringy webbing and the like are not well-suited for imitating patches of snow. It would be desirable then to devise a way to simulate patches of snow on a surface such as a pitched roof, a yard, or other surface to be decorated, in a manner that looks realistic from a distance, using material that is durable and that can be used year-after-year during the holiday season.

SUMMARY OF THE INVENTION

According to one embodiment, a pad for simulating a patch of snow has a base layer that is of irregular shape and is representative of a patch of snow. The outer perimeter is generally curved, although the curvature may change along the perimeter. A white hydrophobic pile is affixed to the base layer to form a white turf surface that, from a distance, has the appearance of snow. Structures project from a plane of the back side of the base layer. To secure the base layer to a surface, such as a sloped roof, areas that are free of pile are provided about the perimeter of the base layer.

Specific embodiments may incorporate on or more features. The pad may include lights, for example, which may be in or on the white turf surface, and/or about the perimeter of the pad. The pad may therefore be adapted to be connected to a power source, such as a battery, which may be solar rechargeable. A microcontroller may be incorporated to control the lights, such as the color of lights and/or sequence of on-off, or to generate music. To keep the pad in place, the pad may be weighted. To simulate a patch of snow, the pad may have a dimension of at least 3 ft. in at least one direction.

The pad may include other features, such as a sound jack, a port for communicating with an onboard microcontroller, and/or a speaker. In one embodiment, there is an area that is free of pile that extends about the entire perimeter of the pad.

In another embodiment, the invention includes a method for simulating patches of snow on a sloped roof. A first pad is placed on a sloped portion of a roof, such that the white turf surface of the first pad is visible from ground level. The first pad is secured to the roof at areas that are free of pile about the perimeter of the base layer of the first pad. A second pad is placed on a sloped portion of the roof at a spaced distance from the first pad, such that the white turf surface of the second pad is also visible from the ground level. The second pad is likewise secured to the roof at areas that are free of pile about the perimeter, such as by nailing, stapling, or otherwise securing through the pad perimeter.

Other objects, features and advantages of the invention will become apparent from a consideration of the following detailed description, the drawings, and the claims.

DETAILED DESCRIPTION OF THE PREFERRED EMBODIMENTS

Figure 1:
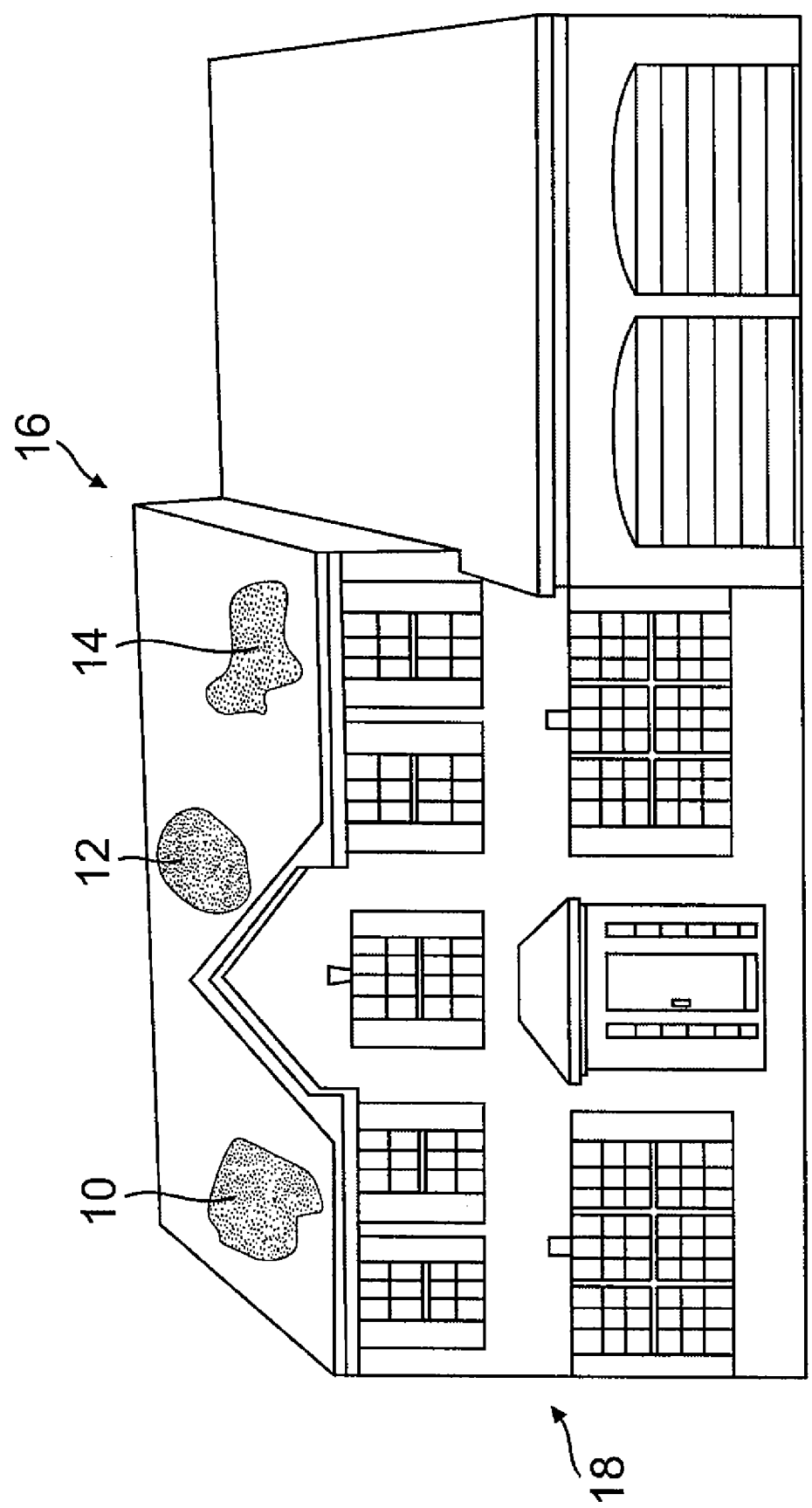
FIG. 1 illustrates pads for simulating a patch of snow according to one embodiment of the invention, as they appear on a slanted roof of a home.
Figure 2:
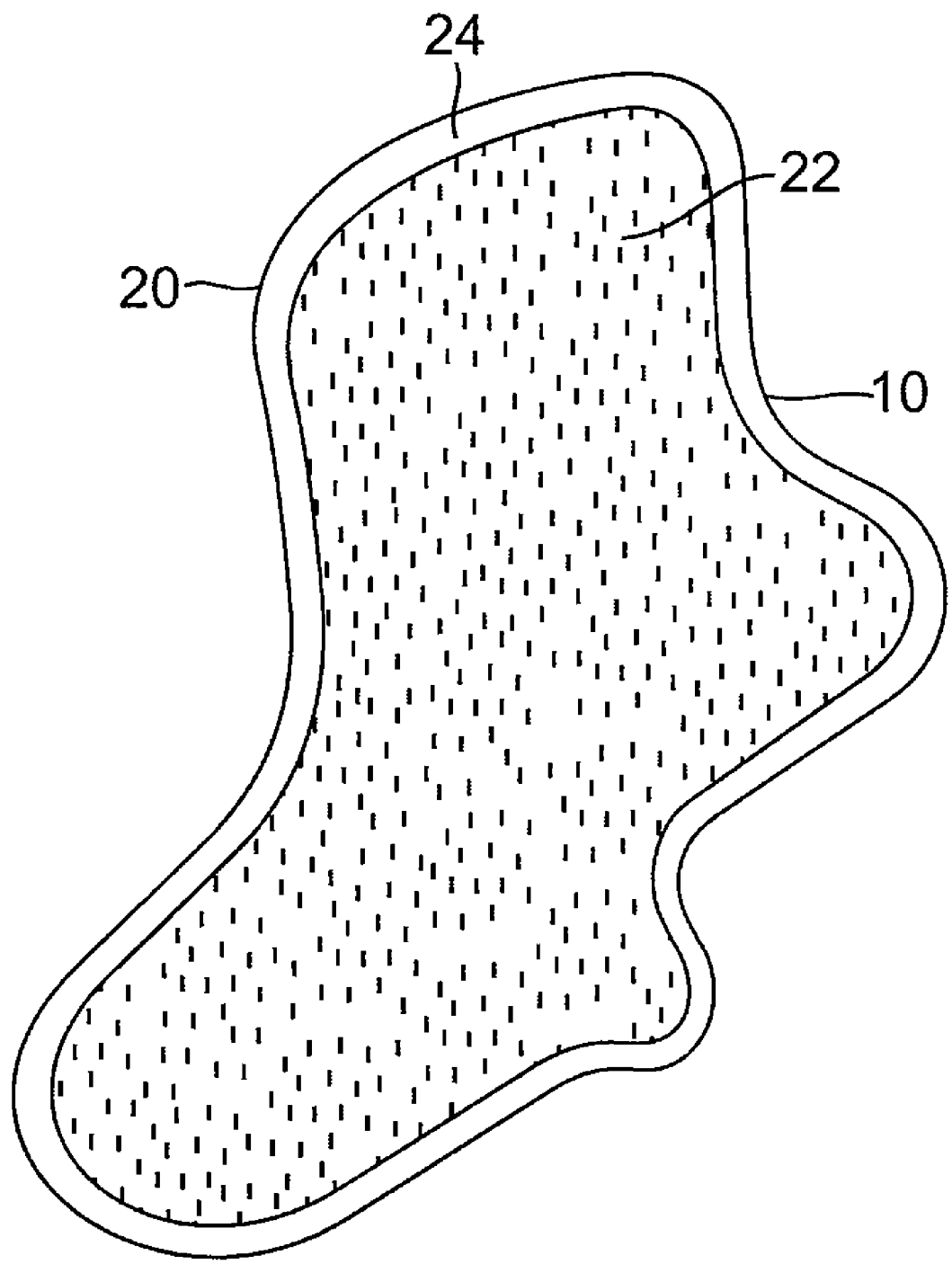
FIG. 2 illustrates one embodiment of a pad for simulating a patch of snow according to one embodiment of the invention.
Figure 3:
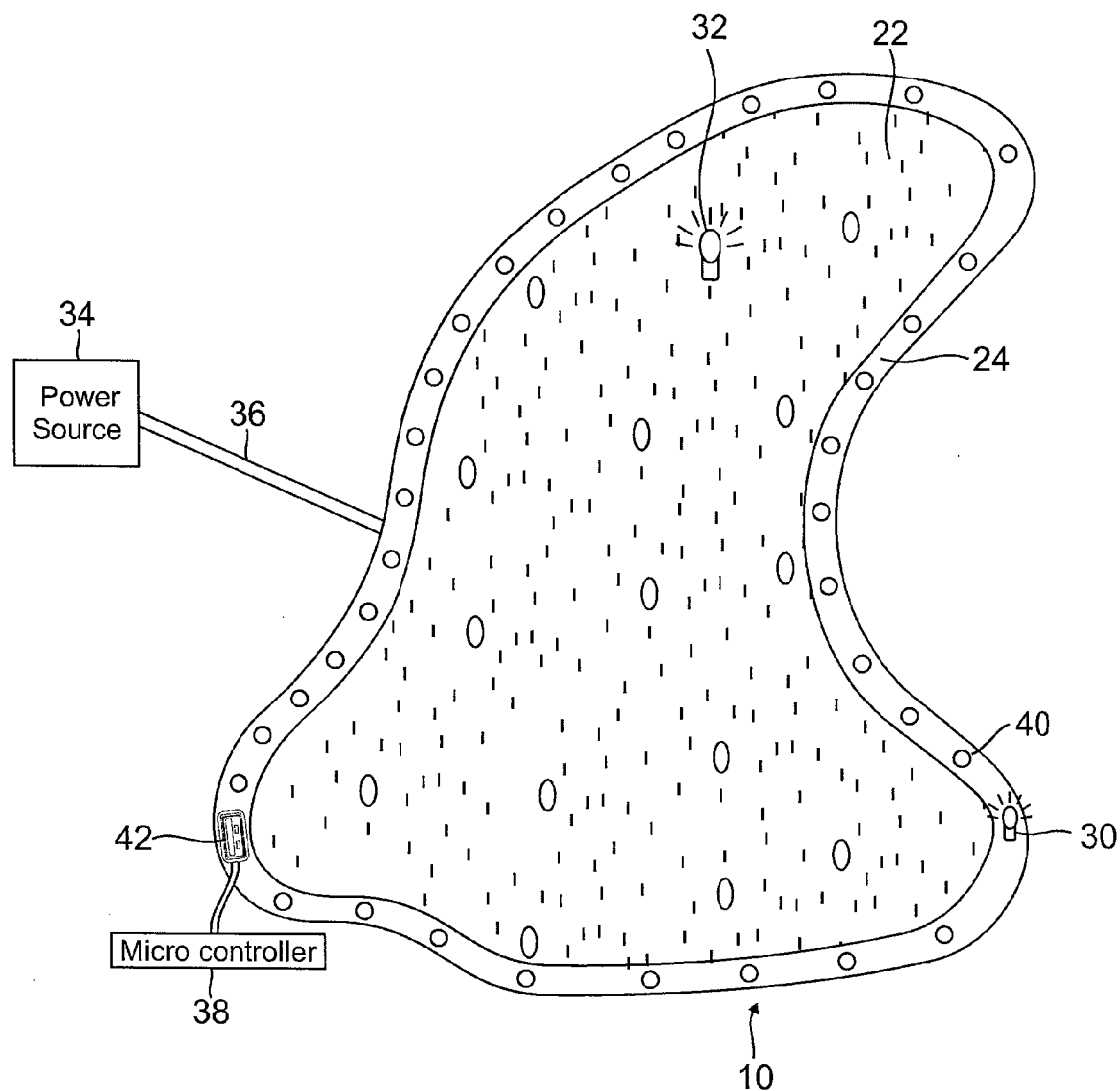
FIG. 3 illustrates features that may be incorporated into particular embodiments of the present invention.

FIG. 1 illustrates a durable, reusable pad for simulating a patch of snow. The patch includes a base layer that has an irregular shape representative of a patch of snow. The patch generally has a curved outer perimeter to simulate the look of a melting patch of snow, although portions of the edge of the pad may be straight. A white hydrophobic pile is affixed to the base layer, to form a white turf surface. The pad has structures projecting from a plane of the back side of the base layer. From a distance, the white turf surface has the look of snow.

The base layer of the pad has areas that are free of pile about the perimeter of the base layer, for securing the base layer to a substrate, such as a roof. The pile-free areas provide convenient places for attaching the pad to the lower surface, such as with staples, nails, or screws. In special situations, other attachment means such as adhesives, hook-and-loop fastening systems, and/or weights may be employed.

A method using this type of pad may be implemented for simulating patches of snow on a sloped roof. A first pad is placed on a surface such as the sloped portion of a roof, such that the white turf surface of the first pad is visible, typically from the ground level. The first pad is secured to the roof, preferably at areas of the pad that are free of pile about the perimeter of the base layer of the pad. A second pad is also placed on a sloped portion of a roof at a spaced distance from the first pad, with the white turf surface of the second pad being visible from the ground level. The second pad is secured to the roof or other substrate, preferably at areas of the pad that are free of pile about the perimeter of the base layer of the second pad.

Artificial snow patch pads according to the present invention may include a variety of optional features. For instance, the pad may have lights. The lights may be around the perimeter of the pad, or on or in the surface of the main portion of the pad itself. To power the lights, the pad may be adapted to be connected to a power source, such as by having a power cord and, if necessary, a transformer. Alternatively, the power source may be a battery, such as a standard battery or a rechargeable battery. If the battery is rechargeable, a solar charger may also be provided to charge the battery during daylight hours.

Another option is to provide the pad with a microcontroller, or to hook the pad up to an external microcontroller, which may for example control a pattern of light in order to put on a light show, either separately for one pad or as part of a coordinated light show involving many pads and/or other lighted decorative elements that are electrically interconnected, such as in a wired network. The pad may also or alternatively be adapted to generate music and may optionally include a sound jack and/or other ports for communicating with other devices. Such ports may be a USB port, serial port, or other communication port.

Concerning dimensions, it is generally desired to simulate a melting patch of snow. Consequently, in a presently preferred embodiment for a rooftop display on a house, the pad has a dimension of at least 3 ft. in one direction, so that the patch is visible from the ground. It is to be understood that there may be special situations in which a smaller patch is desired, such as in a miniaturized display or when the patch is put onto a child's playhouse that is itself relatively small. But larger patches are desired for a rooftop for reasons of visibility.

Concerning materials, one specific embodiment of the invention utilizes a white-colored artificial turf. The turf may be made from any of a variety of materials, such as polyethylene fibers or other material that is resistant to fading from sunlight and is durable in outdoor Winter conditions. Up close, individual blades of pile material may be discerned. But from a distance, it appears to be a continuous patch of white. Artificial turf has the advantage of being weather and sun resistant, and remains intact even if small rooftop animals such as squirrels or, when the patches are used on the ground, domestic animals such as dogs, walk on it. Although artificial turf is commonly formed in a green color, for purposes of the present invention white or slightly off-white turf is preferred. As an alternative, the turf may be speckled with brown or black specks, either with brown or black blades or with separate pieces such as plastic pebbles or the like, to give a slightly dirty appearance for simulating older melting snow.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention, and that particular embodiments of the invention may have additional advantages. Therefore, it is to be understood that, within the scope of the appended claims, the invention may be practiced other than as specifically described herein.

What is claimed is:

1. A pad for simulating a patch of snow, the patch comprising:
   a base layer having an irregular shape representative of a patch of snow and a curved outer perimeter; and
   a white hydrophobic pile affixed to the base layer forming a white turf surface with structures projecting from a plane of the back side of the base layer;
   wherein the base layer has areas that are free of pile about the perimeter of the base layer, for securing the base layer to a substrate.

2. A pad for simulating a patch of snow as defined in claim 1, wherein the pad further comprises lights.

3. A pad for simulating a patch of snow as defined in claim 2, wherein the lights are in the white turf surface.

4. A pad for simulating a patch of snow as defined in claim 2, wherein the lights are in areas that are free of pile about the perimeter of the base layer.

5. A pad for simulating a patch of snow as defined in claim 1, wherein the pad is adapted to be connected to a power source.

6. A pad for simulating a patch of snow as defined in claim 5, wherein the power source is a battery.

7. A pad for simulating a patch of snow as defined in claim 6, wherein the pad further comprises a solar charger for charging the battery.

8. A pad for simulating a patch of snow as defined in claim 1, wherein the pad further comprises weights.

9. A pad for simulating a patch of snow as defined in claim 1, wherein the pad further comprises a microcontroller.

10. A pad for simulating a patch of snow as defined in claim 9, wherein the microcontroller is adapted to control a pattern of light.

11. A pad for simulating a patch of snow as defined in claim 9, wherein the microcontroller is adapted to generate music.

12. A pad for simulating a patch of snow as defined in claim 11, wherein the pad further comprises a sound jack.

13. A pad for simulating a patch of snow as defined in claim 9, wherein the pad further comprises a port for communicating with the microcontroller.

14. A pad for simulating a patch of snow as defined in claim 1, wherein the pad has a dimension of at least 3 ft. in one direction.

15. A pad for simulating a patch of snow as defined in claim 1, wherein the area that are free of pile about the perimeter of the base layer extend about the entire perimeter of the pad.

16. A method for simulating patches of snow on a sloped roof, the method comprising the steps of:
   placing a first pad as defined in claim 1 on a sloped portion of a roof, such that the white turf surface of the first pad is visible from ground level;
   securing the first pad to the roof at areas that are free of pile about the perimeter of the base layer of the first pad;
   placing a second pad as defined in claim 1 on a sloped portion of a roof at a spaced distance from the first pad, such that the white turf surface of the second pad is visible from ground level; and
   securing the second pad to the roof at areas that are free of pile about the perimeter of the base layer of the second pad.

17. A method as defined in claim 16, wherein the method further comprises the step of connecting the pad to a power source.

18. A method as defined in claim 17, wherein the method further comprises the step of charging the power source with solar power.

19. A method as defined in claim 17, wherein the pad includes lights and the method includes powering the lights.

20. A method as defined in claim 19, wherein the method includes the step of controlling the lights in at least one of color of lights and pattern of lights.

21. A method as defined in claim 19, wherein the method includes the step of putting the pad in communication with audio speakers and generating sound with the pad.

* * * * *